(12) United States Patent
Black et al.

(10) Patent No.: US 7,376,767 B1
(45) Date of Patent: May 20, 2008

(54) DISTRIBUTED BUFFERING SYSTEM HAVING PROGRAMMABLE INTERCONNECTING LOGIC AND APPLICATIONS THEREOF

(75) Inventors: William C. Black, Ames, IA (US); Timothy W. Markison, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 1174 days.

(21) Appl. No.: 10/039,204

(22) Filed: Jan. 4, 2002

(51) Int. Cl.
*G06F 3/00* (2006.01)

(52) U.S. Cl. .......................... 710/52; 710/60; 710/65; 710/66; 710/68; 710/71; 370/466; 370/467; 370/468; 370/477

(58) Field of Classification Search .................. 710/52, 710/60, 65, 66, 68, 71
See application file for complete search history.

(56) References Cited

U.S. PATENT DOCUMENTS

| | | | | |
|---|---|---|---|---|
| 5,115,450 | A | * | 5/1992 | Arcuri ......................... 375/219 |
| 5,406,525 | A | | 4/1995 | Nicholes |
| 5,412,783 | A | * | 5/1995 | Skokan ....................... 710/105 |
| 5,438,571 | A | * | 8/1995 | Albrecht et al. ............ 370/408 |
| 5,715,197 | A | | 2/1998 | Nance et al. |
| 5,781,544 | A | * | 7/1998 | Daane ........................ 370/389 |
| 5,784,370 | A | * | 7/1998 | Rich ........................ 370/395.1 |
| 6,104,208 | A | | 8/2000 | Rangasayee |
| 6,233,191 | B1 | | 5/2001 | Gould et al. |
| 6,341,142 | B2 | * | 1/2002 | Ducaroir et al. ............ 375/219 |
| 6,404,752 | B1 | * | 6/2002 | Allen et al. ................. 370/335 |
| 6,956,852 | B1 | * | 10/2005 | Bechtolsheim et al. ..... 370/389 |
| 2003/0016697 | A1 | * | 1/2003 | Jordan ........................ 370/466 |
| 2003/0055998 | A1 | * | 3/2003 | Saha et al. .................. 709/233 |
| 2003/0112031 | A1 | * | 6/2003 | Agrawal et al. .............. 326/41 |
| 2005/0066336 | A1 | * | 3/2005 | Kavoori et al. ............. 719/321 |
| 2006/0129869 | A1 | * | 6/2006 | Hendrickson et al. ...... 713/503 |

OTHER PUBLICATIONS

Erik Ottem; "2Gb Fibre Channel: Making the Transition to the Next Generation of SANs"; printed from Serverworld; White Paper Archives; Aug. 13, 2001; pp.1-6; http://www.serverwordlmagazine.com/webpapers/2001/06_gadzoox.shtml?printme.

"Sun Trunking 1.2"; White Paper; available from Sun Microsystems, 901 San Antonio Road, Palo Alto, CA 94303; Copyright 1999; pp. 1-15.

Mellanox Technologies; "Introduction to InfiniBand"; White Paper; Document No. WP010800140; available from Mellanox Technologies Inc., 2900 Stender Way, Santa Clara, CA 95054; pp. 1-17.

(Continued)

*Primary Examiner*—Niketa Patel
(74) *Attorney, Agent, or Firm*—Timothy W. Markison; Justin Liu; Michael R. Hardaway

(57) ABSTRACT

A distributed buffering system includes at least one input buffer, at least one serializing module, a at least one deserializing module, at least one output buffer, and a programmable logic device. The input buffer is operably coupled to store at least one data block of incoming data. The serializing module serializes the data block as it is retrieved from the input buffer to produce a serial stream of data. The programmable logic device receives the serial stream of data and distributes it to one or more of the at least one deserializing modules. The at least one deserializing module converts the serial stream back into the data block. The recaptured data block is then provided to the corresponding output buffer, which stores the recaptured data.

19 Claims, 10 Drawing Sheets

OTHER PUBLICATIONS

10 Gea; "10 Gigabit Ethernet Technology Overview White Paper"; available from 10 Gigabit Ethernet Alliance; 1300 Bristol St. North, Suite 160, Newport Beach, CA 92660; May 2001, Revision 1.0; pp. 1-21.

Yano, Kazuo et al.; "Sinjgle-Electron Memory for Giga-to-Tera Bit Storage"; Proceedings of the IEEE, vol. 87, No. 4; Apr. 1999; pp. 633-651.

* cited by examiner buffer system 325 buffer system 450

DISTRIBUTED BUFFERING SYSTEM HAVING PROGRAMMABLE INTERCONNECTING LOGIC AND APPLICATIONS THEREOF

TECHNICAL FIELD OF THE INVENTION

This invention relates generally to communication systems and more particularly to buffering and routing data within such communication systems.

BACKGROUND OF THE INVENTION

Communication systems are known to transport large amounts of data between a plurality of end user devices. Such end user devices include telephones, facsimile machines, computers, television sets, cellular phones, personal digital assistants, et cetera. As is also known, such communication systems may be a local area network (LAN) and/or a wide area network (WAN). A local area network is generally understood to be a network that interconnects a plurality of end user devices distributed over a localized area (e.g., up to a radius of 10 kilometers). For example, a local area network may be used to interconnect workstations distributed within offices of a single building or a group of buildings, to interconnect computer based equipment distributed around a factory, hospital, et cetera.

As is further known, local area networks may be wired local area networks or wireless local area networks. Wired local area networks typically have a star topology, ring topology, bus topology, or hub/tree topology. A local area network that utilizes the star topology includes a private automatic branch exchange (PABX) and/or a private digital exchange (PDX). Such devices switch data among the end user devices and/or data terminal equipment (DTE). Such exchange devices allow for voice and/or data to be conveyed between the end user devices and/or the DTE's of the local area network.

A local area network that utilizes a ring topology passes cable access from one DTE and/or end user device to another until all of the DTE's and/or end user devices are interconnected in a loop or ring. The local area network that utilizes a bus topology typically employs one of the Ethernet protocols to convey data within the network. As is known, there are a variety of Ethernet protocols that range from conveying data at rates of 10 megabits per second to multiple gigabits per second. A local area network that utilizes hub technology is essentially a bus or ring topology with the wiring collapsed into a central unit. The central unit includes a set of repeaters that retransmits all of the signals received from the DTE's and/or end user devices to other DTE's and/or end user devices on the same bus or in the same ring.

Wireless local area networks have the end user devices and/or DTE's operably coupled to a server via a wireless connection and a portable access unit. The wireless coupling may be a fixed wire placement, such as for applications by a personal computer, or via portable roaming wireless connections as used by portable devices that vary its location within the local area network. The wireless local area network may utilize a variety of modulation schemes including spread spectrum, quadrature amplitude modulation, time division multiple access, orthogonal frequency division multiplexing, and/or frequency division multiple access.

A wide area network is generally understood to be a network that covers a wide geographic area. Wide area networks include both public data networks and enterprise wide private data networks. The public data network is established and operated by a national network administrator specifically for data transmission. Such public data networks facilitate the internetworking of equipment from different manufacturers. Accordingly, standardization's by the ITU-T have been established for conveying data within public data networks. Currently there are two main types of public data networks; packet switched public data networks and circuit switched public data networks. The public switched telephone network (PSTN) is an example of a circuit switched public data network and the internet is an example of a packet switched public data network. Other examples of wide area networks include integrated service digital networks (ISDN) and broadband multi-service networks.

Regardless of the type of communication system (e.g., LAN or WAN), each communication system employs a data conveyance protocol to ensure the data is accurately conveyed within the system. All such data conveyance protocols (hereinafter referred to as protocols) are based on Layers 1, 2, 3 and/or 4 of the open system interconnection (OSI) 7 layer reference model. As is known, the layers include a physical layer (Layer 1), a data link layer (Layer 2), a network layer (Layer 3), a transport layer (Layer 4), a session layer (Layer 5), a presentation layer (Layer 6), and an application layer (Layer 7).

In general, a protocol is a formal set of rules and conventions that govern how end user devices and/or DTE's exchange information within the communication system. A wide variety of protocols exist, but can be generally categorized into one of four types of protocols; a local area network protocol, a wide area network protocol, network protocol, or routing protocol. The local area network protocols operate at the physical and data link layers and define communication over various local area network media. Wide area network protocols operate at the lower 3 layers of the OSI model and define communication over the various wide area media. Routing protocols are network layer protocols that are responsible for path determination and traffic switching. Network protocols are the various upper layer protocols that exist in a given protocol suite. Examples of such protocols include asynchronous transfer mode (ATM), frame relay, TCP/IP, Ethernet, et cetera.

As is further known, communication systems may be networked together to yield larger communication systems where such networking is typically referred to as internetworking. Internetworking is achieved via internetworking units that allow communication networks using the same or different protocols to be linked together. The internetworking units may be routers, gateways, protocol converters, bridges, and/or switches.

Routers are intelligent devices that connect like and unlike local area networks. They also connect to metropolitan area networks and wide area networks such as X.25, frame relay, and/or ATM based networks. Accordingly, routers operate at the physical layer, the link layer, and/or the network layer of the OSI model to provide addressing and switching. In addition, routers may also operate at Layer 4, the transport layer, in order to ensure end-to-end reliability of data transfers.

A gateway provides an entrance and exit into a communication system. For example, a gateway may be a connection between local area networks, between a local area network and a wide area network, or between wide area networks. Accordingly, a gateway is a node on both networks and provides mapping to all 7 layers of the OSI model. Thus, allowing interfacing between two incompatible systems (e.g., email systems and data file transfer systems) to be interconnected.

A bridge is a data communications device that connects two or more network segments and forwards packets between them. A bridge operates at the physical layer of the OSI reference model and serves as a physical connection between segments, amplifies carrier signals, and buffers data during periods of network congestion. As is also known, bridges are protocol specific (e.g., supports only one of Ethernet, token ring, et cetera).

A switch works at the physical and data link layers of the OSI reference model with emphasis on the data link layer. A switch reads incoming data (e.g., voice or data) to determine a destination address or addresses. Based on each address, a transmission path is setup through a switch matrix between an incoming communication port and an outgoing communication port. In addition, switches include buffering to hold data packets until necessary resources are available to allow packets to be forwarded.

A protocol converter is a communication device that translates a binary data stream from one protocol format into another according to a fixed algorithm. Accordingly, the protocol converter converts data from one protocol to another and may be incorporated in a switch, a bridge, a router and/or a gateway.

As is also known, an internetworking unit has multiple ports (i.e., input ports and output ports) to provide multiple path connections within a network. In operation, an internetworking unit typically receives network data (i.e., packets formatted in accordance with a particular protocol) at multiple input ports, processes the network data received on each input port and outputs the processed data on one or more output ports. As such, for each input port that receives network data, the internetworking unit may output it on one or more output ports after processing it in accordance with the particular functionality of the internetworking unit. To facilitate such a data transfer, the internetworking unit typically stores data words of the incoming packet in an input buffer, subsequently reads the data words out to process them and then stores the process data words in output buffers. Accordingly, the speed of the memory is a significant factor in the speed at which the internetworking unit may process data.

Currently, the speed of memory devices is much less than the desired data rate of internetworking units. For example, a single port dynamic random access memory (DRAM) operates at a rate of approximately 160 megabits per second. To improve the speed of memory, dual port memories, double data rate memories, quad data rate memories, flash memories have been developed. For example, a double data rate memory operates at approximately 320 megabits per second while a quad data rate memory operates at approximately 640 megabits per second. The rate of the memory is established based on the size of the data words being retrieved per read interval. For example, if a data word is 16 bits, and the read rate is 10 megahertz, the resulting memory rate is 160 megabits per second. Accordingly, as the data word size increases, the read rate may be reduced and yet still achieve the particular memory rate. However, as the number of bits in a data word increases, the more pins, PCB traces, and line drivers within integrated circuits are needed. For example, if a desired rate within an internetworking unit is 40 gigabits per second and the system utilizes a 640 megabits per second quad data rate memory, the words sizes would be 125 bits to achieve the 40 gigabits per second rate. As such, multiple quad data rate memories would operate in parallel to achieve the 125 bit data word line which then requires 125 pins on the memory integrated circuits, 125 line drivers within such integrated circuits and 125 traces on the printed circuit board to support such a data rate. Such an implementation would be impractical.

Another issue for internetworking units is that the buffering within the input and output ports may operate at different rates. Thus, when data is conveyed from one port to another, it must operate at the slower of the two rates. Thus, the limitations provided by memory devices are not yielding the desired speeds for internetworking units. This is not a new phenomenon since the desired performance of an internetworking unit has historically led the actual performance of internetworking units and all indications are that this trend will continue.

Therefore, a need exists for a high-speed buffering system that utilizes a minimal number of interconnections to provide data conveyances within a network component, computer system, and/or any other device within a communication system that utilizes buffers as part of a data conveyance scheme.

DETAIL DESCRIPTION OF A PREFERRED EMBODIMENT

Generally, the present invention provides a distributed buffering system that includes at least one input buffer, at least one serializing module, at least one deserializing module, at least one output buffer, and a programmable logic device. The distributed buffering system may be used in any type of data communication and/or processing device, including, but not limited to, network components, computers, personal digital assistants, telephones, entertainment systems, and home networking components. The input buffer, which may include one or more memory devices, is operably coupled to store at least one data block of incoming data. The serializing module serializes the data block as it is retrieved from the input buffer to produce a serial stream of data. The programmable logic device receives the serial stream of data and distributes it to one or more of the at least one deserializing modules based on a distribution instruction, which indicates a particular output buffer that is associated with a deserializing module. Each of the deserializing modules that receive the serial stream of data converts the serial stream back into the data block. The recaptured data block is then provided to the corresponding output buffer, which stores the recaptured data. Such a buffering system may be utilized in a network component computer system, or any device that conveys data utilizing buffers to improve the data transfer rate between input buffers and output buffers while minimizing the number of interconnections there between.

Figure 1:
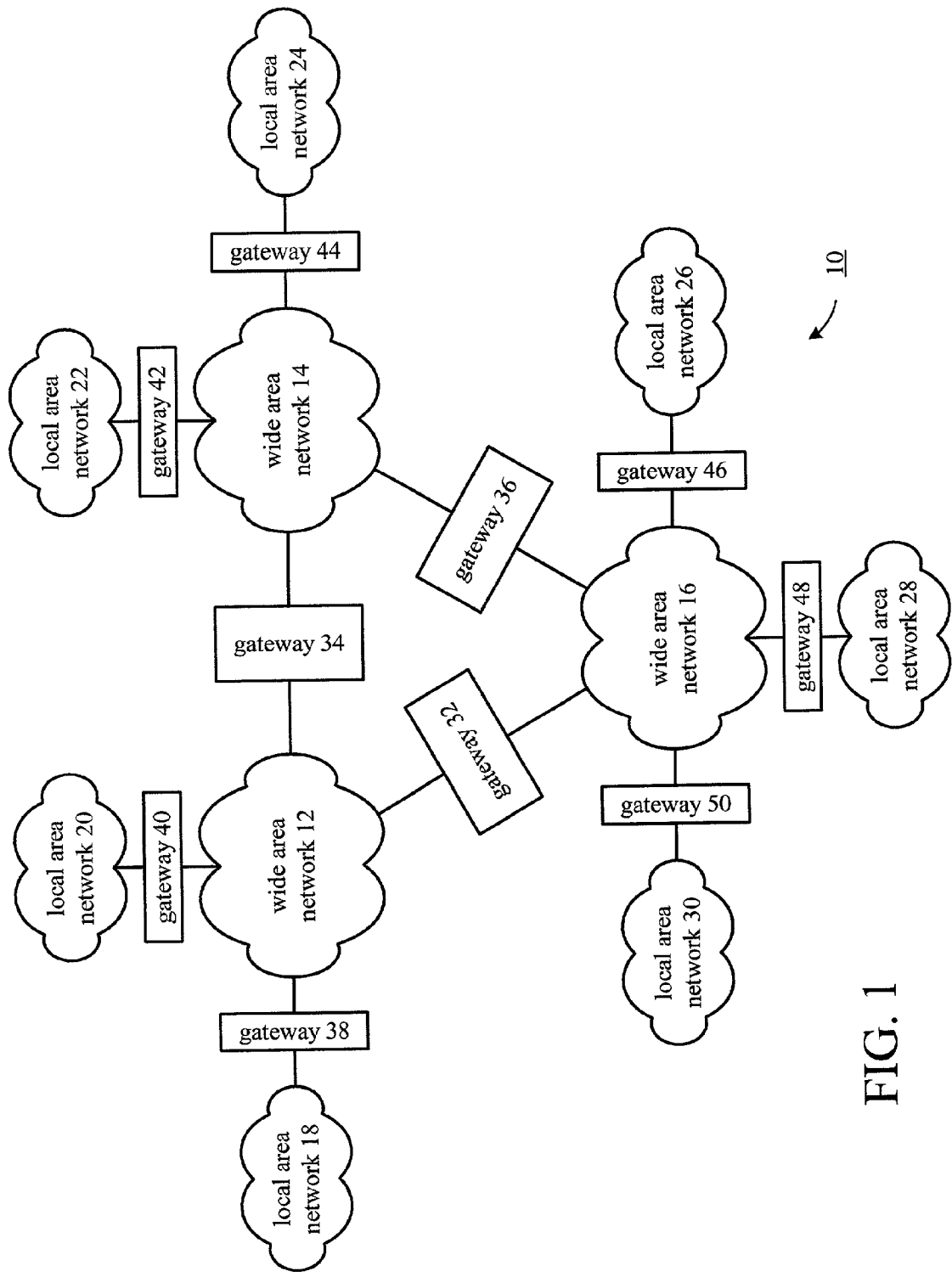
FIG. 1 illustrates a schematic block diagram of a plurality of interconnected networks in accordance with the present invention.

The present invention can be more fully described with reference to FIGS. 1 through 10. FIG. 1 illustrates a schematic block diagram of a communication network 10 that includes a plurality of communication systems 12-16 and 18-30 operably coupled together via gateways 32-50. Communication systems 12-16 are wide area networks and will be described in greater detail with reference to FIG. 3. Communication systems 18-30 are local area networks and will be described in greater detail with reference to FIG. 2.

Each of gateways 32-50 interconnects two networks together. In addition, a gateway may perform routing of data grams (e.g., packets) between the networks; may include protocol conversion technology that allows two networks that operate with different protocols to be linked together; may perform a bridge function; and/or may provide a switching function. If the gateway includes protocol conversion technology, it converts data from one protocol of one network to the protocol of the other network. Such protocol conversion deals with all 7 layers in the protocol stack. As such, the gateway performing a protocol conversion function converts the application layer, presentation layer, session layer, transport layer, network layer, data link layer, and physical layer of one protocol associated with one network and to another protocol associated with the other network. If the gateway is performing a routing function, it is dealing with layers 1 through 3 of the 7 layer protocol stack. As such, the routing function enables the gateway to convert the network layer, data link layer and physical layer from one protocol associated with one network to another protocol associated with the other network.

Figure 2:
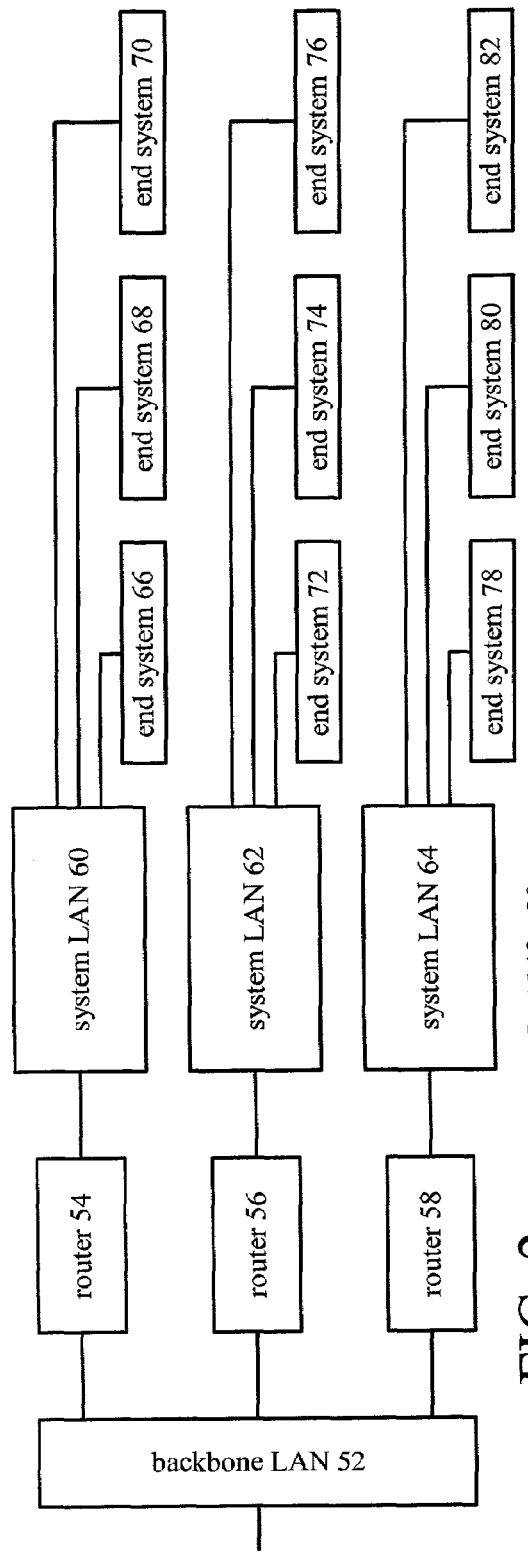
FIG. 2 illustrates a schematic block diagram of a local area network in accordance with the present invention.

FIG. 2 illustrates a schematic block diagram of a local area network 18-30. The local area network 18-30 includes a backbone local area network 52, a plurality of routers 54-58, a plurality of system LANs 60-64 and a plurality of end system 66-82. The end system 66-82 may be a host computer with respect to accessing the internet, an end users computer, facsimile machine, digital telephone, work station, personal digital assistant, et cetera. In general, an end system 66-82 may also be referred to as data terminal equipment (DTE). As is generally understood, a DTE is a generic name for any user device connected to a data network and includes such devices as visual display units, computers, and workstations.

Each end system 66-82 may be operably coupled to its corresponding system LAN 60-64 through a wired connection or wireless connection. Such a wired connection includes twisted pairs, coaxial cable and fiber optics. Each wired LAN may have a topology of a star configuration, ring configuration, bus configuration, hub configuration, and/or tree configuration. It may utilize a medium access control (MAC) method of collision sense multiple access (CSMA), CSMA with collision avoidance, CSMA with collision detection, token ring passing, and/or slotted access. There are several standards that govern wired LANs including ISO/IEEE 802.2/3/4/5.

If the LAN 60-64 is a wired LAN having a bus architecture, it may utilize the CSMA with collision detection MAC protocol. In this configuration, each of the end systems within the local area network 60-64 is coupled to the same cable, which transmits data between pairs and end systems within a particular LAN. Accordingly, each end system within a LAN includes a MAC module that performs the CSMA with collision detection. Such a MAC module allows each of the end system to detect whenever a frame is being transmitted. Each end system, via its MAC module, determines whether the packet is addressing its end system. If so, the MAC module provides the frame to its end system for processing. In addition, the MAC module senses the cable before transmitting a frame onto the cable. If the cable is available, the MAC module transmits the frame. If not, the MAC module waits a predetermined period of time, where each end system has a different predetermined wait time for retransmission of frames. If a collision occurs during the transmission of the frame, the MAC module causes the frame to cease being transmitted and waits the predetermined period of time before retransmission. In addition, the MAC module may also continue transmitting random bit patterns for a short period of time, which is generally referred to as a JAM sequence.

If the local area network 60-64 utilizes a control token, each end system includes a MAC module for processing the control token. In this scheme, a token is passed from one end system to another within the local area network according to a defined set of rules understood and adhered to by each of the end systems. Accordingly, an end system may only transmit a frame when it is in possession of the token. Once the end system has transmitted a frame, it passes the token to another end system within the local area network. To facilitate the token passing, a logical ring is established between each end system within the local area network.

If the LAN is configured to use a slotted ring topology, a monitor initializes the ring to contain a fixed number of bits. The stream of bits continually circulates around the ring from one end system to another. As each end system receives the stream of bits, it examines the bits and passes them to the next end system in the ring. The complete ring is arranged to contain a fixed number of slots, each made up of a set number of bits and capable of carrying a single fixed sized frame. When an end system wishes to transmit a frame, it waits until an empty slot is detected. The end system then marks the slot as full and proceeds to insert the frame content into the slot with both the required destination address and the source address in the header of the frame.

If one or more of the system LANs is a wireless LAN, it utilizes RF and/or infrared transmission medium to convey data with the other end systems. Such a wireless LAN may utilize MAC methods such as CDMA (code division multiple access), CSMA with collision avoidance, CSMA with collision detection, TDMA (time division multiple access), and/or FDMA (frequency division multiple access). There are several standards that govern wireless LANs including IEEE 802.11 and ETSI hyper LAN.

Each of the system LANs is operably coupled to a backbone LAN via a router 54-58. The router is used to provide the interconnectivity between the backbone LAN 52 and the system LANs 60, 62 or 64 when the protocol used by the LANs are different. If the protocol used by LANs 52, 60, 62 and 64 are the same, then bridges may replace the routers. As configured, the backbone LAN 52 via the routers 54-58, provides a large local area network by interconnecting smaller local area networks.

Figure 3:
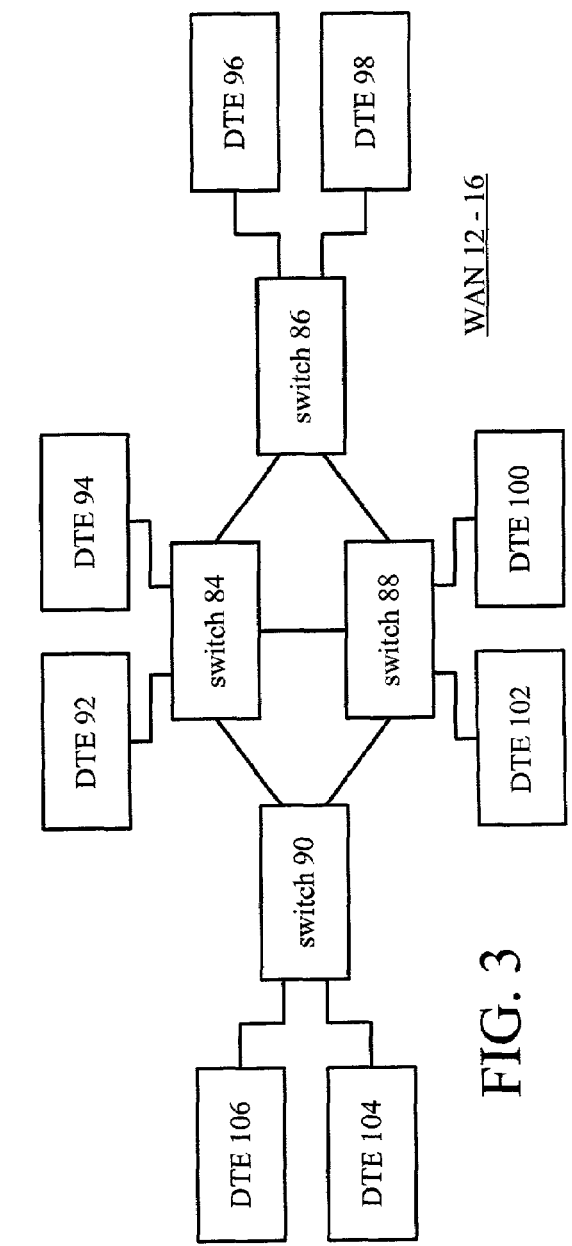
FIG. 3 illustrates a schematic block diagram of a wide area network in accordance with the present invention.

FIG. 3 illustrates a schematic block diagram of a wide area network 12-16. The wide area network 12-16 includes a plurality of switches 84-90 and a plurality of data terminal equipment 92-106. Each of the switches 84-90 is operably coupled to one or more DTEs and is further coupled to one or more of the gateways. Each of the switches 84-90 includes a plurality of printed circuit boards each of which include a plurality of integrated circuits to perform the appropriate switching function. Such switching functions include interpreting incoming data (e.g., voice date, video data, text data, et cetera) to determine a destination address. Based on the destination address, the switch establishes a transmission path through internal switching matrixes between an incoming and outgoing physical communication port and links. The switching function may further include buffering packets of data in temporary memory until the necessary resources are available to allow the data packets to be forwarded. Typically, voice switches do not include buffering since it is not desirable to delay the transmission of voice data.

The data terminal equipment 92-106 may be a terminal device that is part of a broader grouping of equipment known as customer premise equipment, which includes voice as well as data terminals. Such terminal equipment is at the terminal end of a data transmission and includes the transmit and receive circuitry necessary to facilitate the transmission and reception of data. Such DTEs may be in the form of dumb terminals (i.e., a terminal without embedded intelligence in the form of programmed logic), a semi-intelligent terminal, or an intelligent host computer (i.e., a PC, midrange or mainframe computer). The DTE interfaces with the switch via a data communications equipment (DCE). The DCE may be a local area network interface card, a modem, an ISDN terminal adapter, et cetera.

While the wide area networks 12-16 of FIG. 3 have been shown to include a plurality of switches and data terminal equipment, it may be comprised of a variety of topologies. For example, a wide area network may be a packet switched public data network (PSPDN), circuit switched public data network (CSPDN), integrated services digital network (ISDN) and/or a private network. In a circuit switched public data network, a connection is established through a circuit switch network that results in a physical communication channel being setup through the network from a calling party to the receiving party. The two parties exclusively use this connection for the duration of the call. The public switched telephone network (PSTN) generally uses such circuit switched networks.

To facilitate circuit switched transmissions, each switch or router within the wide area network includes an interface protocol. The interface protocol is established based on a particular standard, for example the X.21 standard. The X.21 interface protocol is concerned with the setup and clearing operations associated with each call. The control of insuring data transfers responsibility of the link layer, which, because of the operation of a CSPDN, operates on an end-to-end basis. While the X.21 interface protocol was intended for use with all digital CSPDNs, and is widely used, an alternate interface protocol has been defined, which is known as the X.21 BIS. The X.21 BIS provides an interface for DTE synchronous V series modems and is used on public switch telephone networks. Another standard is the X.21 TSS, which is a specification for Layer 1 interfaces used in the X.25 packet switching protocol and in certain types of circuit switched data transmissions.

If the wide area network is a packet switched public data network, no physical connections are established through the network of a packet switched network. Instead, all data is transmitted in one or more packets by the source DTE. The packets include both the source and destination addresses of the DTEs and are transmitted serially to the local packet switching exchange associated with the source DTE. The exchange stores each packet and then inspects the packets to determine a destination address. Each packet switch exchange includes a routing directory that specifies outgoing links to be used based on network addresses. As such, the packet switch exchange forwards the packets onto the appropriate link at the maximum available bit rate based on the destination address and the information contained in the routing directory. Such packet switched networks typically support datagrams and virtual calls, or virtual circuits. Each datagram is treated as a separate entity as it is routed through the network where packets of a virtual call are treated as being related. A packet switch network is generally developed in accordance with the X.25 standard, which provides a set of protocols that primarily deal with the transport layer, packet layer, data link layer and physical layer.

As one of average skill in the art will appreciate, the networks shown in FIGS. 1, 2 and 3 may be of any topology utilizing any protocol and/or configuration to convey data between users of the system. For example, the networks may be the public switch telephone network, Internet, private networks, public networks, et cetera. As one of average skill in the art will further appreciate, each component within the network (e.g., routers, bridges, switches, gateways, data terminal equipment, end user devices, packet switching exchange, private branch exchange, et cetera) perform certain networking functions to initiate, support and/or participate in a data conveyance. Such a data conveyance may be the transmission of voice data, video data and/or text data. Accordingly, each component within the network includes circuitry to perform the corresponding functions. As the complexity of the corresponding functions increase, the sophistication of the circuitry and amount of circuitry increases correspondingly. As such, each component within the network is, in itself, a network, which is being termed a micro-area network.

Figure 4:
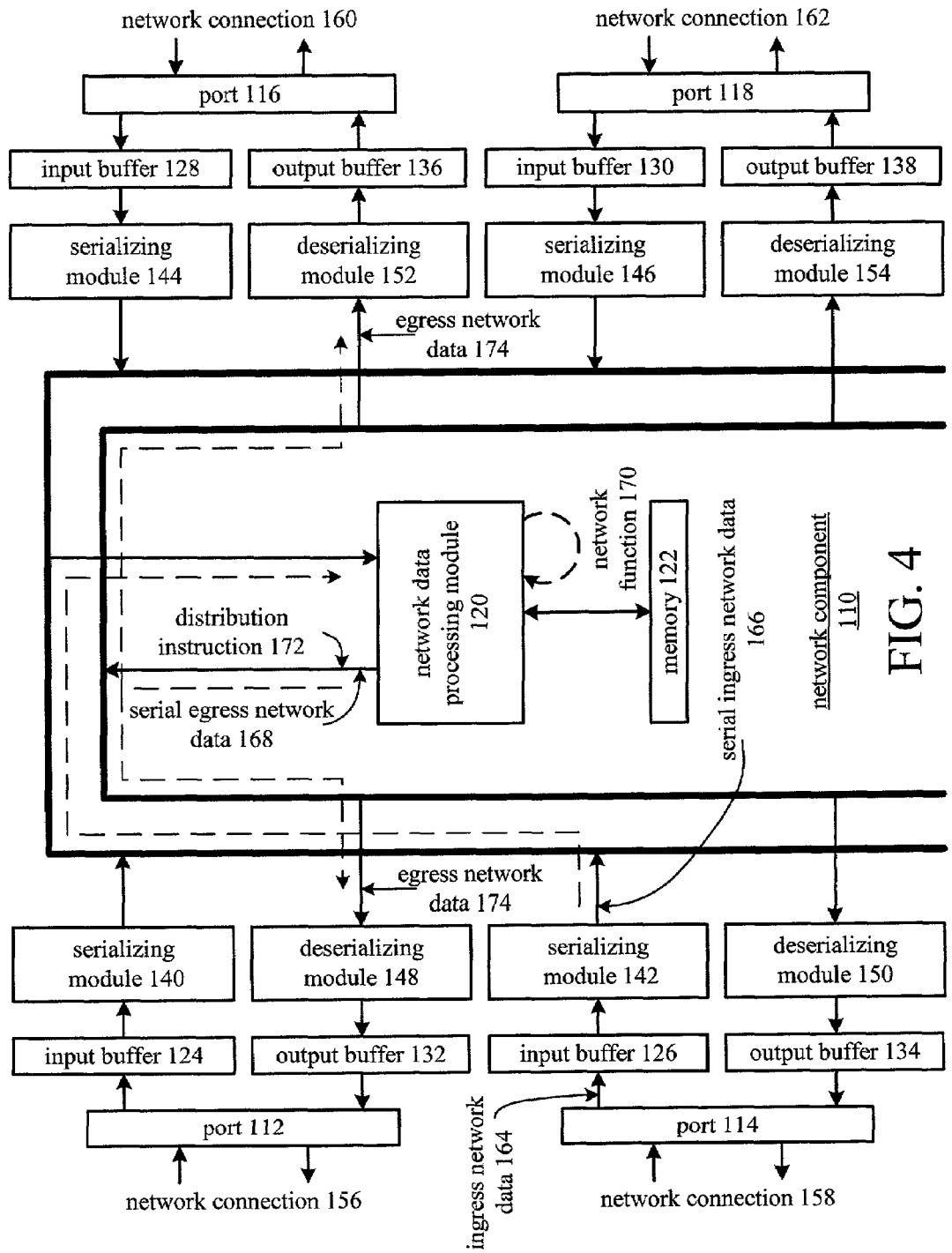
FIG. 4 illustrates a schematic block diagram of a network component in accordance with the present invention.

FIG. 4 illustrates a schematic block diagram of a network component 110. The network component 110 may be a gateway, router, bridge, switch, end system, DTE, computer, and/or any other device that provides support for a communication system and/or accesses a communication system. The network component 110 includes a plurality of I/O ports 112-118. Each of the 10 ports is operably coupled to network connections 156-162. Each network connection 156-162 provides the network component 110 with connectivity to another network component and/or to one or more networks.

The network component 110 also includes a plurality of input buffers 124-130, a plurality of output buffers 132-138, a plurality of serializing modules 140-146, a plurality of deserializing modules 148-152, a network data processing module 120 and memory 122. (Note that, at a minimum, the network component includes at least one input buffer, at least one serializing module, at least one deserializing module, and at least one output buffer.) The network data processing module 120 may be a single processing device or a plurality of processing devices. Such a processing device may be a microprocessor, microcontroller, digital signal processor, field programmable gate array, mask programmable gate array, central processing unit, state machine, logic circuitry, and/or any device that manipulates signals (analog and/or digital) based on operational instructions. The memory 122 may be a single memory device or a plurality of memory devices. Such a memory device may be volatile memory, non-volatile memory, static memory, dynamic memory, random access memory and/or read-only memory.

In general, memory 122 stores operational instructions that, when executed by the network data processing module 120 causes the network data processing module 120 to implement one or more network functions 170. In addition, the memory 122 stores operational instructions that cause the network data processing module 120 to control a distributed buffering system contained within the network component 110. Note that when the processing module implements one or more of it functions via a state machine or logic circuitry, the memory storing the corresponding operational instructions is embedded within the circuitry comprising the state machine or logic circuitry. The operational instructions for controlling a distributed buffering system are described in greater detail with reference to FIG. 10.

The network function 170 performed by the network data processing module 120 is dependent on the particular type of network component 110. For example, if the network component 110 is a bridge, the network function 170 corresponds to a bridge function. If the network component 110 is a switch, the network function 170 corresponds to a switching function. If the network component 110 is a gateway, the network function corresponds to a gateway function. If the network component 110 is a protocol converter, the network function 170 corresponds to protocol conversions. If the network component 110 is a router, the network function 170 corresponds to a routing function. The network component 110 may include bridging functions, switching functions, protocol conversion functions, routing functions, and/or gateway functions to provide a plurality of network functions 170.

The plurality of input buffers 124-130, the plurality of output buffers 132-138, the plurality of serializing modules 140-146, the plurality of deserializing modules 148-154 and a portion of the network data processing module 120 constitutes a distributed buffering system. The serializing modules 140-146 and the deserializing modules 148-154 in combination perform a serial/deserial function that may be in accordance with one or more serial data transmission standards. Such serial data transmission standards include universal serial bus (USB), Ethernet, Infiniband, SERDES, et cetera.

An example of the processing performed by the distributed buffering system within the network component 110, port 114 receives ingress network data 164 from network connection 158, which may be received as parallel and/or serial data. The ingress network data 164 may constitute a network packet that is formatted in accordance with a particular protocol. For example, the particular protocol may be ATM, frame relay, Ethernet, TCP/IP, et cetera. Data blocks of the ingress network data 164 are stored in input buffer 126. Note that if the ingress data is provided serially from the port 114 to the input buffer 126, it would be deserialized before storage in the buffer 126. Each of the input buffers 124-130 may include a plurality of memory devices for storing the data blocks of the network data. Accordingly, the bit line size of a data block may vary depending on the desired configuration of the input buffer 126. For example, the bit line width may be 16 bits, 32 bits, 64 bits, 128 bits, et cetera. A data block may constitute one or more bit lines of memory.

As the data 164 is read from input buffer 126, the serializing module 142 converts the data 164 into serial ingress network data 166. The serializing module 142 may convert the ingress network data 164 into a single line serial bit data stream or a multiple line single bit serial data stream. For example, if the desired data rate is 5 gigabits per second, the serializing module 142 may convert the ingress network data 164 onto one 5 gigabit per second communication path. Alternatively, if the desired bit rate of the serial ingress data 166 is 10 gigabits per second, the serializing module 142 may produce two 5 gigabit per second serial streams of data placed on two separate lines. Accordingly, the interconnection between the serializing modules and the network data processing module 120 may constitute one or more serial data buses. Similarly, the connection between the deserializing modules 148-154 and the network data processing module 120 may constitute one or more data buses.

The network data processing module 120 receives the serial ingress network data 166 and performs the corresponding network function 170 thereon. In addition, the network data processing module 120, based on the network function 170, generates a distribution instruction 172. For example, if the network function 170 is a switching function, the distribution instruction 172 indicates which of the ports are to output the network data to its corresponding network connection. In this example, the processed network data is to be outputted via port 112 and port 116.

The network data processing module 120 outputs serial egress network data 168 onto one or more data buses coupled to the deserializing modules 148-154. Note that the serial egress network data corresponds to the serial ingress data 166 that has been processed in accordance with the network function 170. Deserializing modules 148 and 152 receive the egress network data 174 and perform the complimentary deserializing function as used to serialize the data. Accordingly, the deserializing modules 148 and 152 produce data blocks of egress network data 174. The data blocks of the egress network data are stored in the corresponding output buffers 132 and 136. As the egress data is stored in buffers 132 and 136, they can be provided to the corresponding network connections 156 and 160 via the ports 112 and 116.

As one of average skill in the art will appreciate, one or more of the ports 112-118 may be receiving ingress network data and processed by the network data processing module 120 as generally described with reference to the example for ingress network data 164. Accordingly, the network data processing module 120, the plurality of serializing modules 140-146 and the plurality of deserializing modules 148-154 includes a bus access protocol. Such a bus access protocol may be in accordance with CSMA, CSMA with collision avoidance, CSMA with collision detection, TDMA, token ring concept, slotted frame concept, and/or any other known techniques for accessing a shared bus. Alternatively, the network data processing module 120 may include a bus arbitration function that arbitrates access to the bus amongst itself and the plurality of serializing modules 140-146 and the deserializing modules 148-154.

Figure 5:
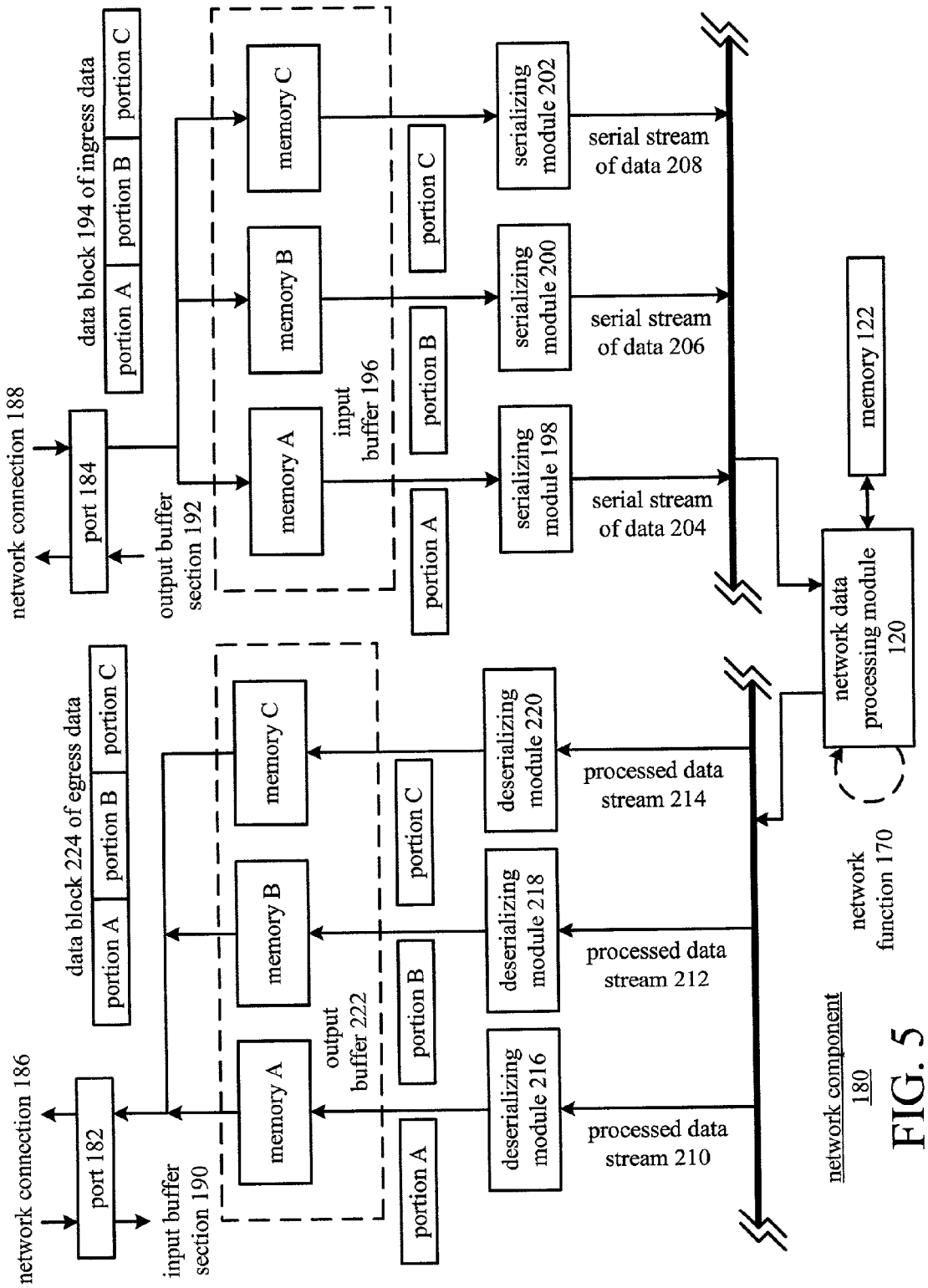
FIG. 5 illustrates a schematic block diagram of an alternate network component in accordance with the present invention.

FIG. 5 illustrates a schematic block diagram of an alternate network component 180. The network component 180 may be a switch, bridge, gateway, router, and/or protocol converter. The network component 180 includes the network data processing module 120, memory 122, ports 182-184, input buffering sections and output buffering sections. Port 182 is operably coupled to network connection 186 and to input buffering section 190 and output buffering section that includes output buffer 222 and deserializing modules 216-

220. Port 184 is coupled to network connection 188 and to output buffering section 192. The input buffering section includes input buffer 196 and serializing modules 198-202. Network connections 186 and 188 couple network component 180 to one or more other network components and/or networks.

As an example of the operation of network component 180, port 184 receives a data block 194 of ingress data via network connection 188. The data block 194 includes multiple portions (for this example, portion A, portion B and portion C). The ingress connection of port 184 is operably coupled to the input buffer 196. As shown, input buffer 196 includes a plurality of memories (for this example, memory section A, memory section B and memory section C). Accordingly, as a data block 194 of ingress data is received, portion A of data block 194 is stored in memory A, portion B is stored in memory B, and portion C is stored in memory C.

As directed by the network data processing module 120, the serializing modules 198-202 retrieve the respective portions of data block 194. As shown, serializing module 198 retrieves portion A from memory A, serializing module 200 retrieves portion B from memory B, and serializing module 202 retrieves portion C from memory C. Each of the serializing modules 198-202 produces a serial stream of data 204-208 from their respective portions of data block 194. The serial streams of data 204-208 are provided to the network data processing module 120. The network data processing module performs a network function 170 upon the serial streams of data 204-208 to produce processed network data.

The network data processing module 120 outputs the processed data as a plurality of streams of processed data 210-214. Deserializing module 216 is operably coupled to receive processed data stream 210, deserializing module 218 receives processed data stream 212 and deserializing module 220 receives processed data stream 214. Each of the deserializing modules 216-220 deserializes the processed data streams 210-214 to produce portions of a data block of egress data. As illustrated, deserializing module 216 produces portion A of data block 224, deserializing module 218 produces portion B and deserializing module 220 produces portion C.

The output buffer 222 includes a plurality of memory devices (for this illustration memory A, memory B and memory C). Each of the memory devices stores a corresponding portion of the data block 224 of egress data. Accordingly, memory A stores portion A, memory B stores portion B, and memory C stores portion C. Under the direction of the network data processing module 120, the output buffer 222 provides the data block 224 of egress data including all of its portions to port 182 for transmission via the network connection 186.

As one of average skill in the art will appreciate, the serializing modules 198-202 and corresponding deserializing modules 216-220 may serialize and deserialize data in accordance with the USB standard, one of the Ethernet standards, SERDES, et cetera. As one of average skill in the art will further appreciate, the serializing modules 198-202 may be implemented via one serializing module that receives all three portions of the data block 194 and produces a single serial stream of data. Correspondingly, deserializing modules 216-220 may be implemented using one deserializing module where the network data processing module 120 outputs a single stream of processed data. As one of average skill in the art will further appreciate, the serializing of the data may utilize multiple serializing modules where the deserializing may use a single module or conversely, the serializing may be done via a single module and the deserializing done by multiple modules.

The output buffer section 192 includes similar components to output buffer 222 and deserializing modules 216 and 220. Input buffer section 190 includes similar components to input buffer 196 and serializing modules 198-202. As one of average skill in the art will appreciate, the network component 180 may include more or less ports than the two illustrated. The same is true for each of the network components shown in FIGS. 4, 5 and 6 of this application.

Figure 6:
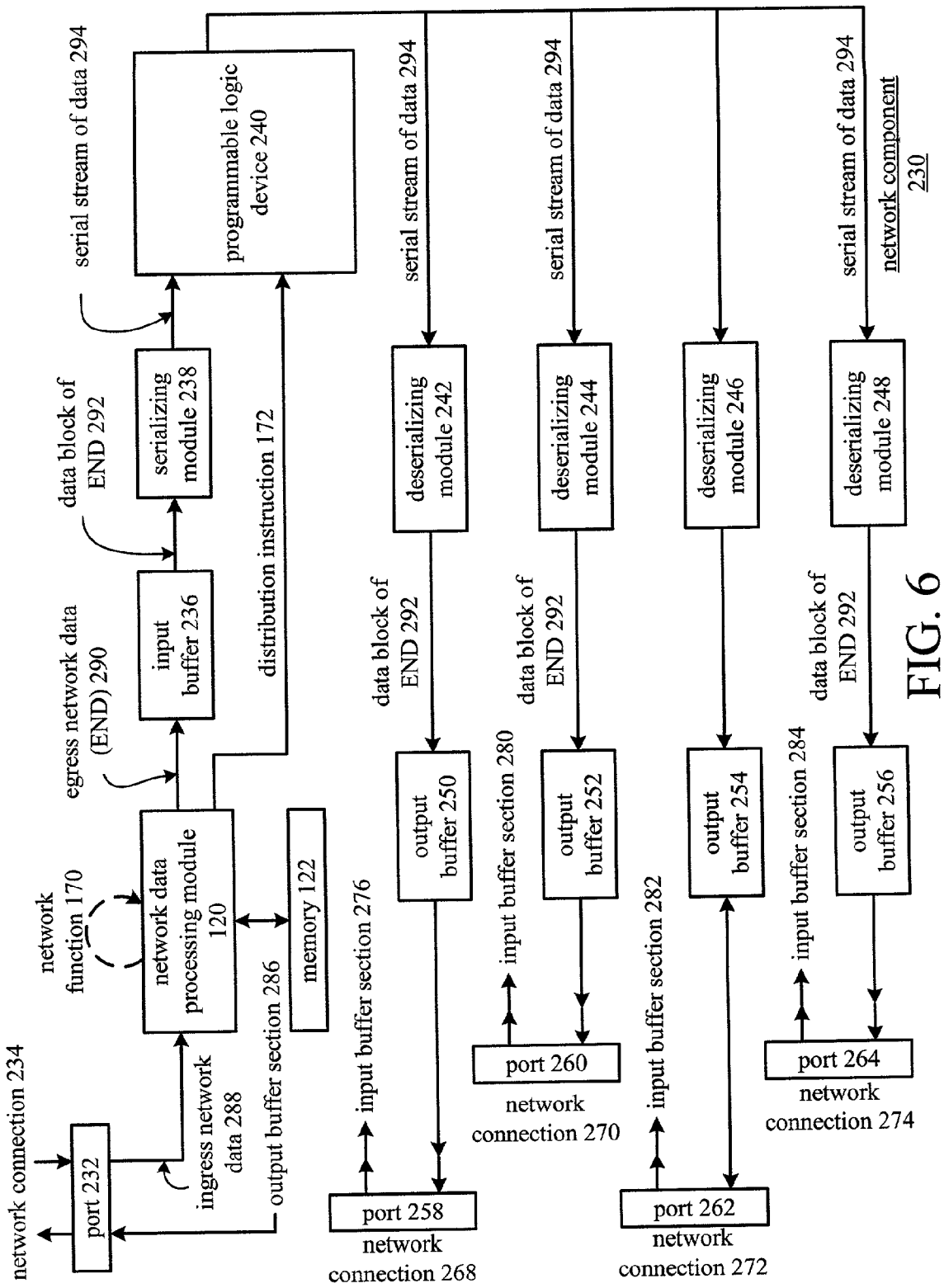
FIG. 6 illustrates a schematic block diagram of yet another network component in accordance with the present invention.

FIG. 6 illustrates a schematic block diagram of another network component 230. The network component 230 may be a switch, bridge, gateway, router and/or protocol converter. The network component 230 includes the network data processing module 120, memory 122, a plurality of ports 232, 258, 260, 262 and 264, a plurality of input buffer sections and a plurality of output buffer sections, and a programmable logic device 240. The programmable logic device 240 may be a field programmable gate array, programmable logic device, mask programmable gate array, configurable state machine, and/or a combination thereof. Each port 232 and 258-264 includes an ingress data path and an egress data path. Each of the ingress data paths is operably coupled to the network data processing module 120, which performs a network function 170 upon ingress network data 288. The resulting network processed data, or egress network data 290 is coupled to an input buffer 236 and a serializing module 238 for the ingress path from port 232. The ingress path for port 258 is operably coupled to input buffer section 276. Such an input buffer section 276 includes a connection to network data processing module 120 and a similar input buffer to that of 236 and a similar serializing module to that of serializing module 238. Similarly, input buffer sections 280, 282 and 284 include coupling to the network data processing module and similar input buffers to that of input buffer 236 and similar serializing modules to that of serializing module 238.

The network data processing module 120 may receive ingress network data 288 from one or more of ports 232 and 258-264. In the example illustrated in FIG. 6, the network data processing module 120 receives the ingress network data 288 via port 232. The network data processing module 120 performs a network function 170 upon the ingress network data 288 to produce egress network data 290 and a distribution instruction 172. The network data processing module 120 provides the egress network data 290 to input buffer 232. Note that input buffer 232 may include one or more memories to store the egress network data.

The network data processing module 120 provides the distribution instruction 172 to the programmable logic device 240. The distribution instruction 172 indicates how the programmable logic device 240 is to be configured to distribute the serial stream of data 294 to the corresponding output sections of ports 258-264. The serializing module 238, which includes one or more serializing modules depending on the memory configuration of input buffer 236, serializes the data block of egress network data 292 to produce the serial stream of data 294.

For this illustration, the programmable logic device 240, based on the distribution instruction 172, is configured to output the serial stream of data 294 to deserializing module 242, 244 and 248. As illustrated, the output buffering sections associated with port 258 includes deserializing module 242 and output buffer 250. The output buffering section associated with port 260 includes deserializing module 244 and output buffer 252. The output buffering section associated with port 262 includes output buffer 254 and deserializing module 246. The output buffering section associated with port 264 includes output buffer 256 and deserializing module 248. Accordingly, output buffer section 286 corresponding to port 232 includes an output buffer similar to that of output buffer 250 and a deserializing module similar to that of deserializing module 242.

Each of the deserializing modules 240, 242, 244 and 248 convert the serial stream of data 294 into a data block of egress network data 292. The deserializing modules 242, 244 and 248 provide the data block of egress network data 292 to its corresponding output buffer 250. The output buffer, which includes one or more memories, stores the data block of egress network data 292 for subsequent transport via port 258, 260 and 264 onto network connections 268, 270 and 274.

Figure 7:
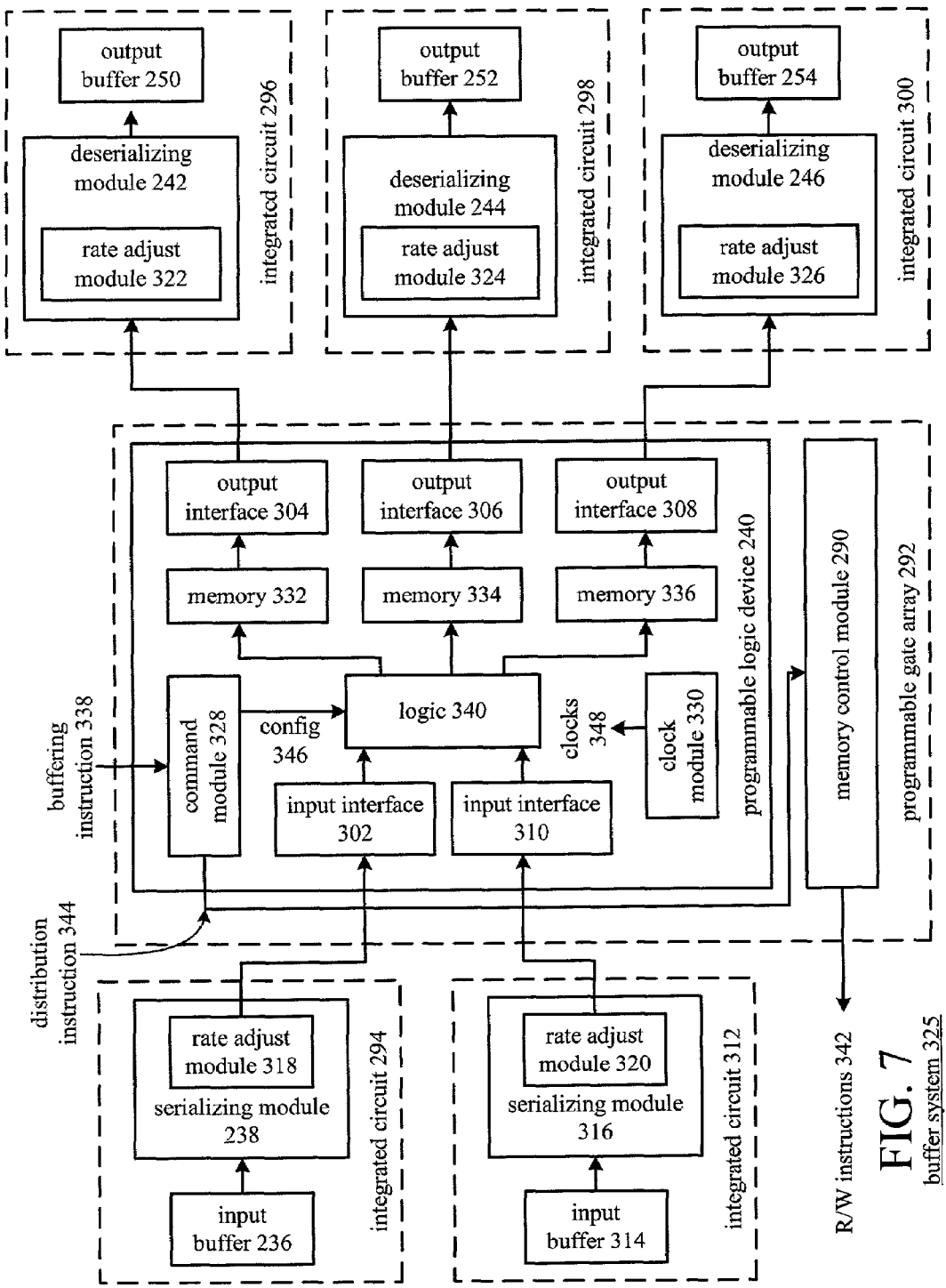
FIG. 7 illustrates a distributed buffering system in accordance with the present invention.

FIG. 7 illustrates a distributed buffering system 325 that may be used in a network component, computer system, and/or any other device that conveys data from one connection to another. The distributed buffering system 325 includes input buffering integrated circuits 294 and 312, a programmable gate array 294, and a plurality of output buffering integrated circuits 296-300. Each of the input buffering integrated circuits 294 and 312 include an input buffer 236, 314 and a serializing module 238, 316. Each of the serializing modules 238 and 316 may further include a rate adjust module 318, 320. The programmable gate array 292 may be configured to produce a memory control module 290 and a programmable logic device 240. The programmable logic device 240 may be configured to produce a command module 328, input interfaces 302, 310, logic circuitry 340, a clock module 330, memory 332-336 and output interfaces 304-308. Each of the output buffering integrated circuits 296-300 include a deserializing module 242-246 and an output buffer 250-254. Each of the deserializing modules 242-246 may further include as rate adjust module 322-326.

For each data conveyance of a data block from an input buffer to one or more output buffers, the programmable gate array 292 receives a buffering instruction 338. The command module 328 of the programmable logic device 240 receives the buffering instruction 338 and produces therefrom a configuration signal 346 and a distribution instruction 344. The command module 328 provides the configuration signal 346 to the logic circuitry 340. Based on the configuration signal 346, the logic circuitry 340 is configured to provide data received via one of the input interfaces 302 or 310 to one or more of the output interfaces 304-308 either directly or via memories 332-336. As one of average skill in the art will appreciate, memories 332-336 may be used as a temporary buffer to store output data when the particular port that the output buffer 250, 252 or 254 is coupled to is busy. If the output port is available, memory 332, 334 or 336 may be bypassed thus directly providing the data to the output interface 304-308.

If the buffering instruction 338 corresponds to data being received by input buffer 236 and indicates that the data is to be outputted via output buffers 250 and 254, the command module 328 generates the configuration signal 346 such that logic circuitry 340 is configured to couple the input interface 302 to the output interface 304 and output interface 308 either directly or via memory 332 and 336, respectively. Accordingly, the buffering instruction 338 will indicate whether the memory 332-336 is to be bypassed or utilized when providing data to the output buffering integrated circuits 296-300.

The command module 328 provides the distribution instruction 344 to memory control module 290. The memory control module 290 generates a plurality of read-write instructions 342 based on the distribution instruction 344. For instance, read instructions are provided to input buffer 236 such that the ingress data stored therein is read into serializing module 238. Similarly, the memory control module 290 provides write instructions to memories 332-336 when such memories are used. In addition, when memories 332 and 336 are used, memory control module 290 provides read instructions to the memories. Further, memory control module 290 generates write instructions that are provided to output buffers 250-254 to store the corresponding egress data. Thus, once the command module 328 has processed the buffering instruction 338 to set-up the distributed buffering system for conveyance of data, the input buffer (for this example 236) stores a data word of data. In accordance with the read instructions provided by memory control module 290, the data word is provided to serializing module 238.

The serializing module may serialize the data word and provide it directly to input interface 302 utilizing a conventional serializing scheme such as USB, Ethernet, SERDES, et cetera. In this mode, the serializing module 238 provides data to the input interface 302 at a maximum rate of the data path between the serializing module 238 and the input interface 302 or at some predetermined rate. Alternatively, or in addition to, the serializing module 238 may adjust the bit rate of the serialized data provided to input interface 302 via the rate adjust module 318. The rate adjust module adjusts the bit rate of the interface between the serializing module 238 and input interface 302 based on the rate of the input buffer and the data width of the input buffer. As such, if only a certain amount of data can be extracted in a given time from the input buffer 238, the rate adjust module 318 adjust the speed of the interconnection between the serializing module 238 and the input interface 302 to correspond with the rate the data can be extracted from the input buffer 232.

As the input interface 302 receives the serialized data from integrated circuit 294, it provides it to logic circuitry 340. The input interface 302 may forward the received data in a serial fashion or convert the serialized data into data words for processing within the programmable logic device 240. Upon receiving the data, the logic device 340 provides it either to the internal memories 332-336 or directly to the output interfaces 304-308. If the data is provided to memories 332-336, the memory control module 290 provides read and write instructions thereto for accurate storage and retrieval of the data.

When the data is to be retrieved, or is directly provided to the output interfaces 304-308, the output interfaces receive the data. If the data remained in a serialized form, the output interfaces 304-308 provide the serialized data to one or more of the output buffering integrated circuits 296-300. If the serialized data was converted to data words, the output interfaces 304-308 convert the data back into a serialized manner and provide the serialized data to one or more of the output buffering integrated circuits 296-300. Accordingly, the programmable gate array 292 requires a high-speed interface to produce the input interfaces 302 and 310 and output interfaces 304-308. Such a programmable gate array may be one of the field programmable gate arrays designed and manufactured by Xilinx Corporation.

As one or more of the output integrated buffering circuits 296-300 receive the serialized data, its corresponding deserializing module 242-246 deserializes the data to produce data words. The data words are then stored in the corresponding output buffers 250-254. Each of the deserializing modules 242-246 may perform a rate adjustment on the received serialized data based on the memory rate of output buffers 250-254, respectively. Such a rate adjustment may be based on the rate of the input buffer and the data width of the input buffer. Alternatively, the rate adjust may be based on the rate of the corresponding output buffer and the data width of the corresponding output buffer. As such, if the output buffer has a memory rate of 160 bits per second, the rate adjust module 322-326 adjusts the rate of the serialized data accordingly.

The clock module 330 produces one or more clock signals that coordinate the synchronization of data transfers throughout the distributed buffering system. The clocks 348 produced by clock module 330 may include a bit rate clock, frame rate clock, et cetera. Such a clock module 330 may be implemented utilizing on-chip clock circuitry found in field programmable gate arrays produced and manufactured by Xilinx Corporation.

As one of average skill in the art will appreciate, the distributed buffering system 325 may be implemented on a single integrated circuit to produce a simplified distributed buffering system, each of the input buffering sections may be implemented on a single integrated circuit as well as the output buffering sections may be implemented on a single integrated circuit and/or any combination of integrated circuits may be used to achieve the distributed buffering system. As one of average skill in the art will further appreciate, the distributed buffering system 325 may include more or less input integrated circuits and/or more or less output integrated circuits. In addition, the programmable logic device 240 may be implemented utilizing one or more programmable gate arrays as well as the memory control module.

Figure 8:
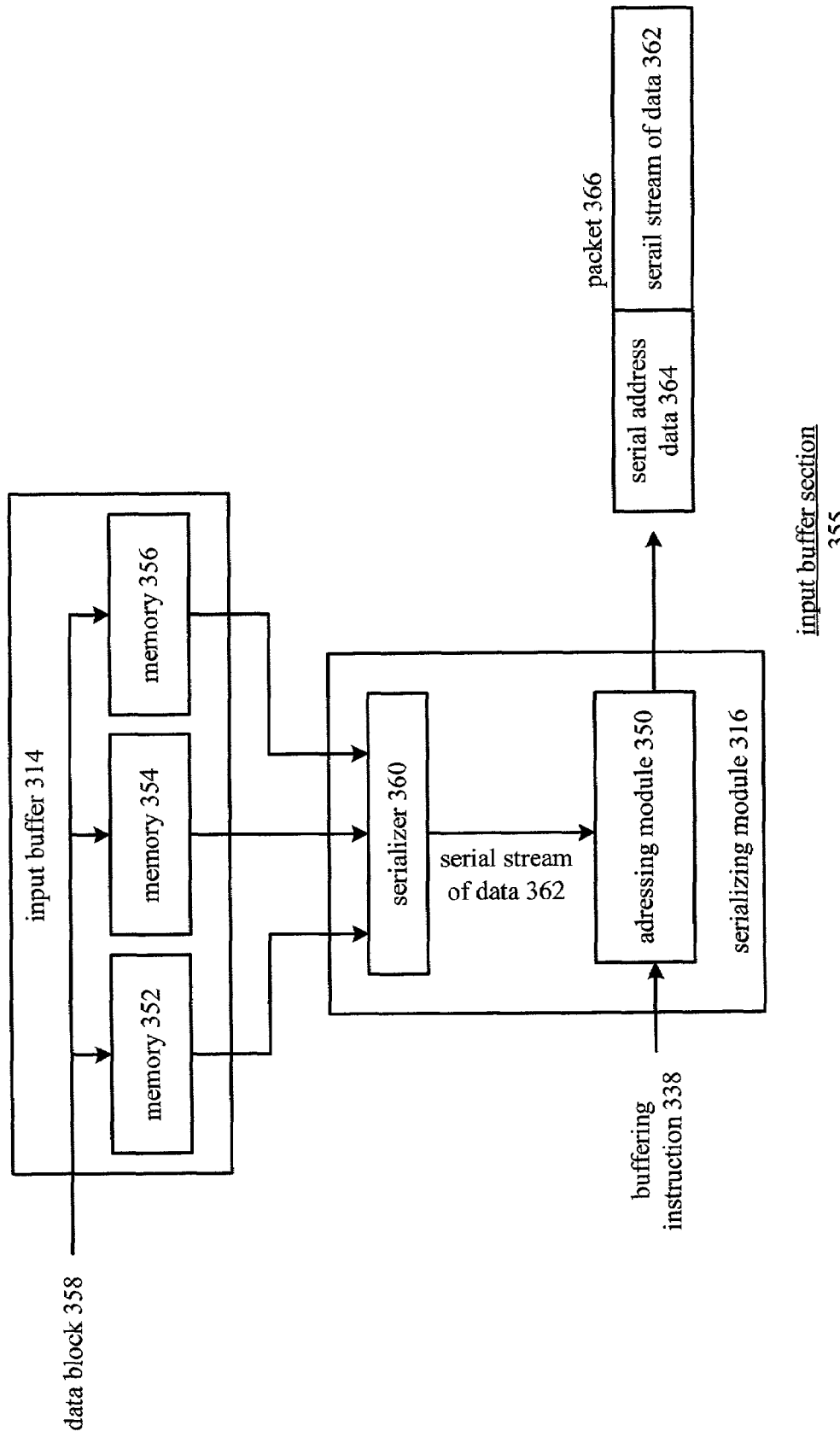
FIG. 8 illustrates a schematic block diagram of an input buffer section in accordance with the present invention.

FIG. 8 illustrates a schematic block diagram of an input buffering section 355 that may be used in any of the distributed buffering systems described herein. The input buffering section 355 includes an input buffer 314, and a serializing module 316. The input buffer 314 includes a plurality of memory devices 352-356. The serializing module 316 includes a serializer 360 and an addressing module 350.

In operation, the input buffer 314 receives a data block 358 of data and stores portions within each of the memory sections 352-356. Alternatively, depending on the size of the data block, one or more of the memories may store the data block. In accordance with the buffering instruction 338, the input buffer 340 provides the data block from one or more of the memory sections 352-356 to the serializer 360 of serializing module 316. The serializer 360 performs a serialization function on the data block 358 to produce a serial stream of data 362. The serialization function may be in accordance with any standard protocol for serializing data including, but not limited to USB, Ethernet, Infiniband, and/or SERDES. The addressing module 350 receives the serial stream of data 362 and the buffering instruction 338.

The buffering instruction 338 includes addressing information, which indicates the particular output buffers that are to receive the serialized stream of data 362. The addressing module 350 serializes the addressing information and produces packet 366. As shown, packet 366 includes the serial address data 364 and the serial stream of data 362. The packet of data is provided to the programmable logic device of the distributed buffering system, which is configured to provide the data onto a shared bus with the output buffers.

Each output buffer section includes a deserializing module that further includes an addressing module. The addressing module determines whether the serial address data 364 is addressing the particular output buffer. If so, the deserializing module deserializes the stream of data 362 to recapture the data block 358. If the particular output block is not being addressed, the output buffering section ignores the data.

As an alternate embodiment, the programmable logic device may interpret the serial address data 364 to determine the particular output buffering sections to provide the data to. As one of average skill in the art will appreciate, there are numerous ways in which data may be routed from an input buffer to one or more output buffers in accordance with the present invention.

Figure 9:
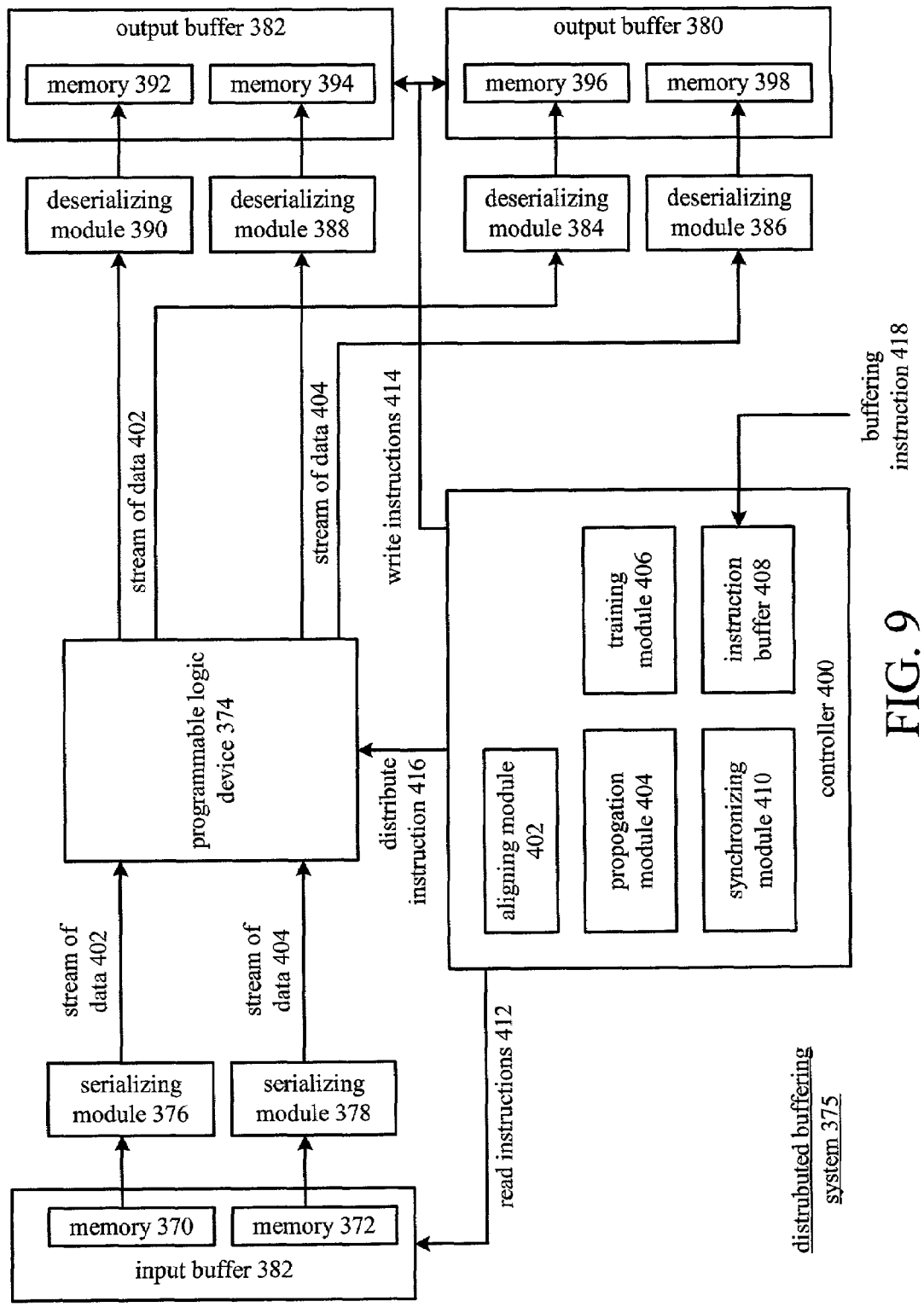
FIG. 9 illustrates a schematic block diagram of an alternate distributed buffering system in accordance with the present invention.

FIG. 9 illustrates a schematic block diagram of another embodiment of a distributed buffering system 375. The distributed buffering system 375 includes an input buffer 382, serializing modules 376 and 378, programmable logic device 374, deserializing modules 384-390 and output buffers 380 and 382, and controller 400. In this embodiment, the input buffer 382 includes a plurality of memories 370-372. Similarly, each output buffer 380 and 382 includes a plurality of memories 396, 398, and 392 and 394, respectively. The controller 400 includes an aligning module 402, propagation module 404, synchronizing module 410, training module 406 and instruction buffer 408.

In operation, the controller 400 receives one or more buffering instructions 418. The buffering instructions may be provided by a network data processing module 120, central processing unit, or similar type device when the distributed buffering system is included in a network component, computer system, et cetera. If the distributed buffering system 375 is available, the controller processes the buffering instruction 418 to produce read instructions 412, distribute instruction 416 and write instructions 414.

If, however, the corresponding input buffers and/or output buffers are unavailable when the buffering instruction 418 is received, the buffering instruction 418 is queued within the instruction buffer 408 until the resources of the distributed buffering system 375 are available.

The input buffer 382 stores a data word in the plurality of memories 370 and 372. Serializing modules 376 and 378 separately serialize the portions of the data blocks stored in memories 370 and 372. The corresponding streams of data 402 and 404 are provided to the programmable logic device 374. Based on the distribute instruction 416, the programmable logic device 374 provides the stream of data 402 and stream of data 404 to one or more of the output buffering sections. The stream of data 404 is deserialized by deserializing module 390, when this output buffering section is to receive the data. If the data is also to be received by the other output buffering section, deserializing module 384 deserializes the stream of data 402. Similarly, deserializing module 388 and/or 386 deserializes the stream of data 404. Each of the deserializing modules 384-390 provides a portion of a data block to corresponding memories 392-398.

In this illustration, each portion of a data block is treated separately as it is conveyed from the input buffer 382 to one or more of the output buffers 380 and 382. To ensure that the portions of the data blocks are accurately processed, the controller 400 includes the aligning module 402, the propagation module 404, the synchronizing module 410 and the training module 406. The training module 406, prior to actual transmission of valid data, provides test data over each path between the programmable logic device and the plurality of input memories and also over each of the paths between the programmable logic device and the plurality of output memories to determine propagation delay for each of these paths. The propagation module maintains the propagation delay for each path between the input memories and the programmable logic device and the output memories and the programmable logic device, which is used by the aligning module 402 to ensure that the portions of the data block are subsequently aligned within the corresponding output buffers 380 and/or 382. The synchronizing module 410 provides the clocking information to convey data from the input buffer 382 through the programmable logic device 374 to one or more of the output buffers 380 and 382.

The controller 400 and its corresponding modules 402-410 may be implemented via a processing module in memory. Such a processing module may be a single processing device or a plurality of processing devices. Such a processing device may be a microprocessor, microcontroller, digital signal processor, programmable gate array, central processing unit, state machine, logic circuitry, and/or any device that manipulates signals (analog and/or digital) based on operational instructions. The memory may be a single memory device or a plurality of memory devices. Such a memory device may be a volatile memory, non-volatile memory, dynamic memory, static memory, read-only memory, and/or random access memory. Note that when one or more the processing functions are implemented via a state machine or logic circuitry performed by the processing module, the corresponding memory is embedded within the circuitry comprising the state machine or logic circuit. The operational instructions stored in the memory and executed by the processing module are further described with reference to FIG. 10.

Figure 10:
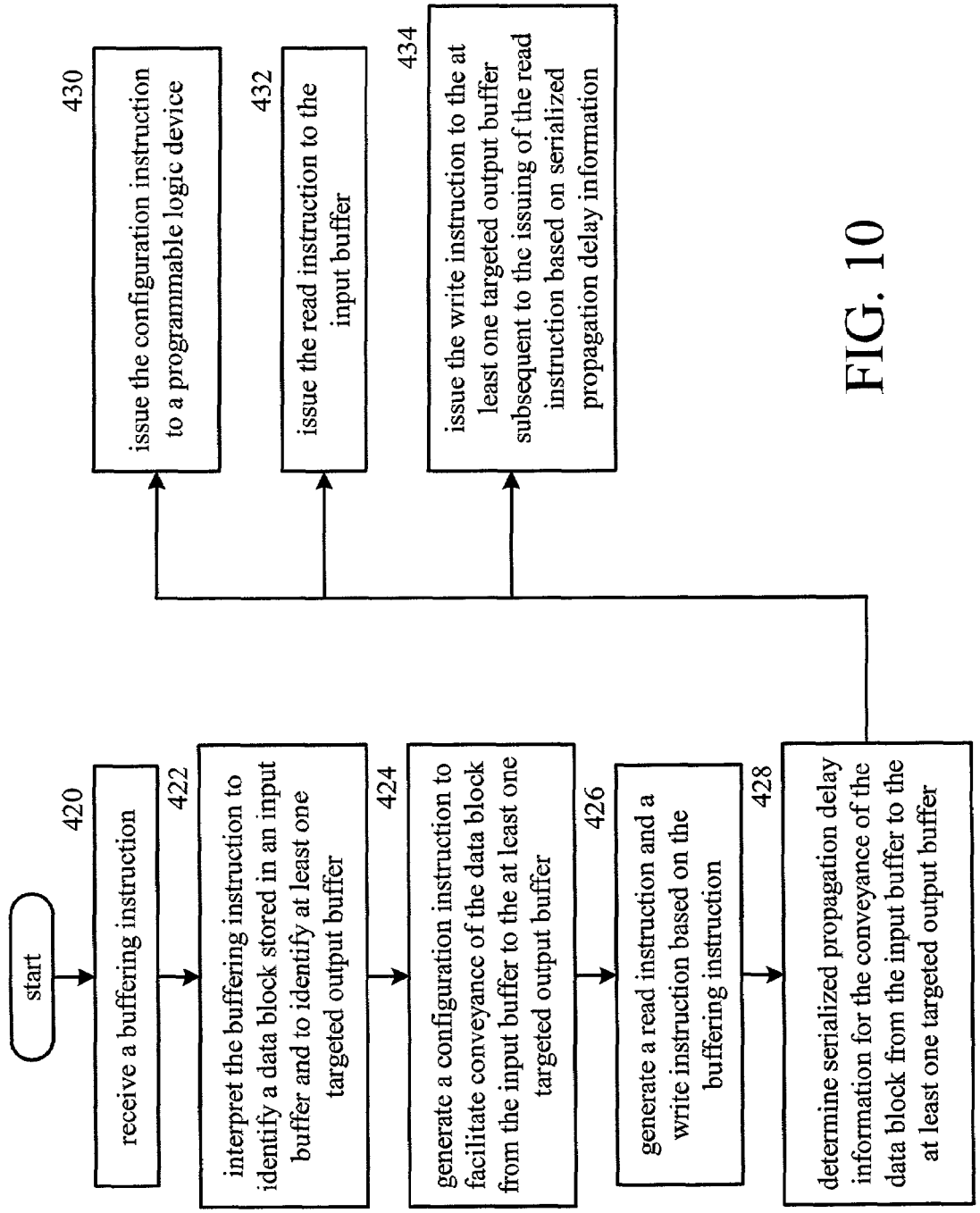
FIG. 10 illustrates a logic diagram of a method for controlling a distributed buffering system in accordance with the present invention.

FIG. 10 illustrates a logic diagram of a method for controlling a distributed buffering system. The processing begins at Step 420 where a buffer instruction is received. The buffering instruction may be provided by a network data processing module to indicate which of a plurality of output buffers are to receive data from an input buffer. The process then proceeds to Step 422 where the buffering instruction is interpreted to identify a data block stored in an input buffer and to identify at least one target output buffer.

The process then proceeds to Step 424 where a configuration and instruction is generated to facilitate the conveyance of the data block from the input buffer to the at least one target output buffer. The configuration instruction is then provided to a programmable logic device as illustrated in FIG. 7. The process then proceeds to Step 426 where a read instruction and a write instruction are generated based on the buffering instruction.

The process then proceeds to Step 428 where serialized propagation delay information is determined for the conveyance of the data block from the input buffer to the at least one targeted output buffer. The determination of the serialized propagation delay information includes determining segment propagation delays between the input buffer and a programmable logic device and the propagation delays between the programmable logic device and the targeted output buffers. This may be done by initiating a transference of test data between the input buffer and the programmable logic device. Based on the transference of the test data, the propagation delay between the input buffer and programmable logic device may be determined. In addition, a test data may be transmitted between the programmable logic device and each of the output buffers. By monitoring the transference of the test data, the propagation delays between the programmable logic device and each of the output buffers may be readily determined. The determination of the serialized propagation delay information may further include determining a serializing rate for serializing the data block. The serializing rate is based on the memory rate of the input buffer and the data width of the input buffer. The same may be done for each of the output buffers.

The process then proceeds to Step 430, 432 and 434. At Step 430, the configuration instruction is provided to the programmable logic device. As previously described with reference to FIG. 7, the programmable logic device configures itself based on the configuration instruction to support the data conveyance between the input buffer and the targeted output buffer or buffers. At Step 432, the read instruction is issued to the input buffer. At Step 434, the write instruction is issued to the at least one targeted output buffer subsequently to issuing the read instruction to the input buffer. The timing of issuing the read instruction, configuration instruction, and write instruction, is based on, at least in part, the serialized propagation delay information.

Figure 11:
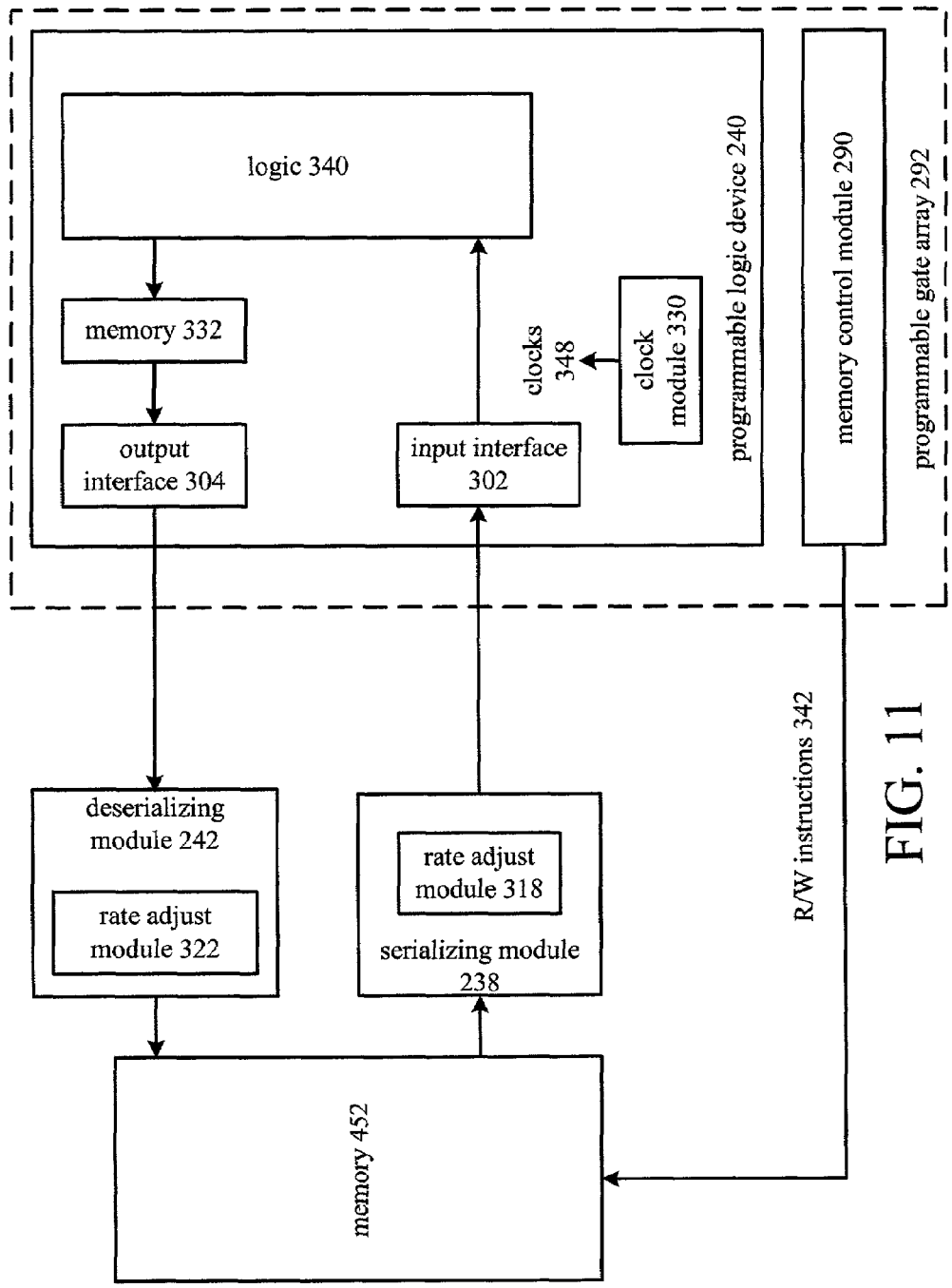
FIG. 11 illustrates a schematic block diagram of a further buffering system in accordance with the present invention.

FIG. 11 illustrates a schematic block diagram of a buffer system 450 that includes a programmable gate array 292, memory 452, deserializing module 242, and serializing module 238. The programmable gate array 292 includes a memory control module 290 and a programmable logic device 240. The programmable logic device 240 may be configured and/or constructed to provide an output interface 304, memory 332, programmable logic fabric 340, an input interface 302, and a clock module 330. The deserializing module 242 may include a rate adjust module 322 and the serializing module 238 may include a rate adjust module 318.

In operation, the programmable logic device 240 generates data while performing a function. The function will be dependent upon the functionality of the device incorporating the buffer system 450, where such devices include, but are not limited to, network components, computers, personal digital assistants, telephones, entertainment systems, and home networking components. The data generated may be intermediate data, i.e., data that the programmable logic device will further process, resultant data, or any other type of data usable and/or generated by the programmable logic device 240.

The data may be temporarily stored in memory 332 before providing it to the memory 452 via the output interface 304. The output interface 304 is operably coupled to provide the data as serial stream of the data to the deserializing module 242. The deserializing module 242, which may include the rate adjust module 322, converts the serial stream of the data into words of the data. The deserializing module provides the words of the data to the memory 452 for storage.

The memory 452 stores the data words based on the write instructions produced by the memory control module 290. The memory 452 may be a single port RAM, dual port RAM, quad port RAM, flash memory, any devise that stores digital information, and/or a combination thereof. At some point in time after the data words are stored, the memory control module 290 will generate read instructions to retrieve the data words. Upon receiving the read instructions, the memory 452 provides the retrieved data words to the serializing module 238. The serializing module 238, which may include the rate adjust module 318, converts the stored words of the data into serial data to produce a recaptured serial stream of the data. The serializing module then provides the recaptured serial stream of the data to the input interface 302 of the programmable logic device 240.

The input interface 302 converts the recaptured serial stream of data into data words that are further processed by the programmable logic fabric. The providing and retrieving of the data from the memory is synchronously performed in accordance with the clock signals generated by the clock module 330.

The preceding discussion has presented a distributed buffering system and applications within network components and other data conveying devices. By utilizing a programmable logic device to interconnect input buffers and output buffers, data may be serially conveyed from the input buffer through the programmable logic device to one or more of the targeted output buffers. By utilizing the programmable logic device and serial interfaces, the rate of data conveyance through such a buffering system is improved and the number of interconnections is decreased in comparison with comparable systems of the prior art. As one of average skill in the art will appreciate, other embodiments may be derived from the teachings of the present invention, without deviating from the scope of the claims.

What is claimed is:

1. A distributed buffering system comprises:
    input buffer that includes a plurality of input memories, wherein the input buffer stores at least one data block and wherein each of the plurality of input memories stores a corresponding portion of the at least one data block;
    plurality of serializing modules operably coupled to the plurality of input memories, wherein each of the plurality of serializing modules serializes the corresponding portion of the at least one data block to produce a plurality of streams of data;
    programmable logic device operably coupled to distribute the plurality of streams of data to at least one of a plurality of output buffers based on a distribute instruction, wherein each of the plurality of output buffers includes a plurality of output memories;
    plurality of deserializing modules, wherein each of the plurality of deserializing modules is operably coupled to a corresponding one of the plurality of output memories of each of the plurality of output buffers, wherein corresponding ones of the plurality of deserializing modules deserializes a corresponding one of the plurality of streams of data to recapture the corresponding portions of the at least one block of data, wherein the plurality of output memories of the at least one of the output buffers stores the recaptured corresponding portions of the at least one block data; and
    controller operably coupled to the input buffer, the programmable logic, and the plurality of output buffers, wherein the controller generates the distribute instruction, generates a plurality of read instructions, and a plurality of write instructions, wherein the plurality of read instructions are provided to the plurality of input memories, and wherein the plurality of write instructions are provided to the plurality of output memories of the at least one of the plurality of output buffers wherein the controller further comprises: aligning module operably coupled to align access to the recaptured corresponding portions of the at least one data block from the plurality of output memories of the at least one of the plurality of output buffers.

2. The distributed buffering system of claim 1, wherein the controller further comprises:
    propagation module operably coupled to maintain propagation delay information for each path between the programmable logic device and the plurality of input memories and for each path between the programmable logic device and the plurality of output memories of the each of the plurality of output buffers.

3. The distributed buffering system of claim 2, wherein the controller further comprises:
    training module operably coupled to provide test data over each of the paths between the programmable logic device and the plurality of input memories and over each of the paths between the programmable logic device and the plurality of output memories of the each of the plurality of output buffers, wherein the propagation module determines the propagation delay information based on the test data.

4. The distributed buffering system of claim 2, wherein the programmable logic device further comprises:
    memory operably coupled to provide buffering for at least some of the paths between the programmable logic device and the plurality of input memories and the paths between the programmable logic device and the plurality of output memories of the each of the plurality of output buffers to facilitate the align access to the recaptured corresponding portions of the at least one data block.

5. The distributed buffering system of claim 1, wherein the controller further comprises:
    instruction buffer operably coupled to queue incoming instructions based on propagation delay of distributing the at least one data block between the input buffer and the at least one of the plurality output buffers.

6. The distributed buffering system of claim 1, wherein the controller further comprises:
    synchronizing module operably coupled to synchronize distributing the at least one data block between the input buffer and the at least one of the plurality of output buffers.

7. The distributed buffering system of claim 1, wherein the controller is implemented as a memory control module operably coupled to the input buffer, the programmable logic device, and the at least one output buffer, wherein the memory control module generates a read instruction and generates a write instruction based on the distribution instruction, wherein the read instruction is provided to the input buffer and the write instruction is provided to the at least one output buffer.

8. The distributed buffering system of claim 7 further comprises:
    a programmable gate array programmed to function as the memory control module and to function as the programmable logic device for distributing the serial stream of data.

9. The distributed buffering system of claim 1 further comprises:
    an input integrated circuit that includes the input buffer and the serializing module; and
    a plurality of output integrated circuits, wherein each of the plurality of output integrated circuits includes an output buffer and a corresponding deserializing module.

10. The distributed buffering system of claim 1, wherein the at least one output buffer includes a plurality of output buffers, wherein the at least one deserializing module includes a plurality of deserializing modules, and wherein the programmable logic device further comprises:
    input interface operably coupled to receive the serial stream of data;
    plurality of output interfaces operably coupled to the plurality of output buffers; and
    programmable logic fabric operable to provide selective connectivity between the input interface and the plurality of output interfaces, wherein the input interface deserializes the serial stream of data to produce deserialized data and wherein each of the plurality of output interfaces selectively connected to the input interface serializes the deserialized data to recapture the serial stream of data.

11. The distributed buffering system of claim 1 further comprises:
a plurality of input buffers that include the input buffer; and
a plurality of serializing modules that include the serializing module, wherein the plurality of serializing modules is operably coupled to the plurality of input buffers.

12. The distributed buffering system of claim 1, wherein the serializing module further comprises a rate adjusting module that establishes bit rate of the serializing module based on rate of the input buffer and data width of the input buffer.

13. The distributing buffering system of claim 12, wherein the at least one output buffers further comprise a rate adjusting module that establishes bit rate of the at least one output buffer based on the rate of the input buffer and the data width of the input buffer.

14. The distributed buffering system of claim 12, wherein the at least one output buffer further comprise rate adjusting module that establishes bit rate of the at least one output buffer based on rate of the at least one output buffer and data width of the at least one output buffer.

15. The distributed buffering system of claim 1, wherein the programmable logic device further comprises a command module operably coupled to receive a buffering instruction, wherein the command module generates the distribution instruction and a logic configuration signal based on the buffering instruction, wherein the logic configuration signal configures logic of the programmable logic device.

16. The distributed buffering system of claim 1, wherein the programmable logic device further comprises a clock module operably coupled to generate clocking signals, wherein the clock module provides the clocking signals to the input buffer, the serializing module, the plurality of deserializing modules, and the plurality of output buffers.

17. The distributed buffering system of claim 1, wherein the serializing module further comprises an addressing module operably coupled to serialize, as part of the serial stream of data, at least one address of the at least one of the plurality of output buffers based on a buffering instruction, and wherein the programmable logic device includes an interpreting module to extract the at least one address from the serial stream of data.

18. The distributed buffering system of claim 1, wherein the programmable logic device further comprises memory operably coupled to buffer the serial stream of data, to delay providing of the serial stream of data to the at least one output buffer, or to cache the serial stream of data for the at least one output buffer.

19. The distributed buffering system of claim 1, wherein the input buffer further comprises a plurality of memories operably coupled to the serializing module, wherein each of the plurality of memories stores a corresponding portion of the at least one data block.

* * * * *